(12) United States Patent
Park et al.

(10) Patent No.: US 8,883,344 B2
(45) Date of Patent: Nov. 11, 2014

(54) ELECTROLYTE FOR LITHIUM SECONDARY BATTERY AND LITHIUM SECONDARY BATTERY INCLUDING THE SAME

(75) Inventors: Sinyoung Park, Yongin-si (KR); Yongbeom Lee, Yongin-si (KR); Sunyoung Kim, Yongin-si (KR); Bora Lee, Yoning-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 414 days.

(21) Appl. No.: 13/251,478

(22) Filed: Oct. 3, 2011

(65) Prior Publication Data

US 2013/0029230 A1 Jan. 31, 2013

(30) Foreign Application Priority Data

Oct. 6, 2010 (KR) .................. 10-2010-0097285

(51) Int. Cl.
| | |
|---|---|
| *H01M 6/04* | (2006.01) |
| *H01M 6/16* | (2006.01) |
| *H01M 10/42* | (2006.01) |
| *H01M 10/0567* | (2010.01) |

(52) U.S. Cl.
CPC .. *H01M 10/0567* (2013.01); *H01M 2300/0034* (2013.01); *H01M 6/168* (2013.01); *H01M 10/4235* (2013.01); *Y02E 60/12* (2013.01)
USPC ........... 429/188; 429/324; 429/326; 429/332; 429/333

(58) Field of Classification Search
USPC .................. 429/188, 324, 326, 240, 332, 333
See application file for complete search history.

(56) References Cited

U.S. PATENT DOCUMENTS

| | | | | |
|---|---|---|---|---|
| 5,273,840 | A * | 12/1993 | Dominey ................... | 429/307 |
| 5,633,098 | A * | 5/1997 | Narang et al. ............... | 429/104 |
| 2003/0162090 | A1* | 8/2003 | Okada et al. ................. | 429/137 |
| 2005/0123836 | A1* | 6/2005 | Otsuki et al. ................ | 429/339 |
| 2007/0224514 | A1* | 9/2007 | Kotato et al. ............... | 429/325 |
| 2008/0145763 | A1* | 6/2008 | Koh et al. .................... | 429/342 |
| 2009/0053612 | A1* | 2/2009 | Ihara et al. .................. | 429/329 |
| 2009/0233179 | A1 | 9/2009 | Ihara et al. | |
| 2010/0119956 | A1* | 5/2010 | Tokuda et al. ............... | 429/338 |
| 2011/0117443 | A1* | 5/2011 | Lee et al. ..................... | 429/328 |
| 2012/0164519 | A1* | 6/2012 | Lee et al. ..................... | 429/163 |

FOREIGN PATENT DOCUMENTS

| | | | |
|---|---|---|---|
| JP | 2000-294281 | * | 10/2000 |
| KR | 10-2001-0031892 A | | 4/2001 |
| KR | 10-2005-0040854 A | | 5/2005 |

(Continued)

OTHER PUBLICATIONS

JP 2000-294281 MT.*

(Continued)

*Primary Examiner* — Patrick Ryan
(74) *Attorney, Agent, or Firm* — Robert E. Bushnell, Esq.

(57) ABSTRACT

An electrolyte for a lithium secondary battery having flame retardancy, low negative electrode interfacial resistance, and excellent high temperature properties and life characteristics, and a lithium secondary battery including the same. An electrolyte for a lithium secondary battery of the present invention may include a non-aqueous organic solvent, a lithium salt, fluorinated ether or phosphazene, and a resistance-improving additive represented as the following chemical formula (1):

$$FSO_2-R_1-SO_2F \quad \text{[Chemical Formula 1]}$$

wherein $R_1$ is a $C_1$-$C_{12}$ hydrocarbon unsubstituted or substituted with at least one fluorine.

16 Claims, 4 Drawing Sheets

(56) References Cited

FOREIGN PATENT DOCUMENTS

| KR | 1020060116423 | 11/2006 |
| KR | 10-2009-0020493 A | 2/2009 |
| KR | 10-2009-0099496 A | 9/2009 |

OTHER PUBLICATIONS

Korean Notice of Allowance issued Jun. 21, 2012 in connection with Korean Patent Application Serial No. 10-2010-0097285 and Request for Entry of the Accompanying Office Action attached herewith.

* cited by examiner

ELECTROLYTE FOR LITHIUM SECONDARY BATTERY AND LITHIUM SECONDARY BATTERY INCLUDING THE SAME

CLAIM OF PRIORITY

This application claims priority to and the benefit of Korean Patent Application No. 10-2010-0097285, filed on 6 Oct. 2010, in the Korean Intellectual Property Office, the entire content of which is incorporated herein by reference.

BACKGROUND

1. Field

Embodiments relate to an electrolyte for a lithium secondary battery and a lithium secondary battery including the same.

2. Description of the Related Art

An electrolyte for a lithium secondary battery is formed from a mixed solution prepared by dissolving one or more lithium salt selected from $LiPF_6$, $LiBF_4$, LiBOB, LiFOB, LiTFSI, LiBETI and others into a solvent mixture of cyclic esters such as ethylene carbonate (EC), propylene carbonate (PC), butylenes carbonate (BC), gamma-butyrolactone (GBL), gamma-valerolactone (GVL) and others, and chain esters such as dimethyl carbonate (DMC), ethylmethyl carbonate (EMC), diethyl carbonate (DEC), dipropyl carbonate (DPC), acetate, propionate, butyrate, hexanoate and others. However, the above-mentioned organic solvents as combustible materials have limitations in that they are liable to cause combustion, and they are vulnerable to safety. Therefore, a way of enhancing flame retardancy by additionally mixing flame retarding additives of fluorine-based compounds or phosphorus compounds such as phosphate, phosphazene and others with the electrolyte for lithium secondary battery has been examined.

However, the electrolyte for a lithium secondary battery has a limitation that, when the flame retarding additives are added in the electrolyte for a lithium secondary battery, a solid electrolyte interface (SEI) having high resistance is formed on the surface of the negative electrode to result in a drop in performance of the lithium secondary battery.

SUMMARY

An aspect of the present invention provides an electrolyte for a lithium secondary battery having flame retardancy, low negative electrode interfacial resistance, and excellent high temperature properties and life characteristics, and a lithium secondary battery including the same.

According to at least one of embodiments, an electrolyte for a lithium secondary battery includes a non-aqueous organic solvent, a lithium salt, fluorinated ether (F-ether) or phosphazene, and a resistance-improving additive represented by the following chemical formula (1):

$$FSO_2—R_1—SO_2F \qquad \text{[Chemical Formula 2]}$$

wherein $R_1$ is a C1-C12 hydrocarbon unsubstituted or substituted with at least one fluorine.

The resistance-improving additive may be contained in an amount of 0.1 to 5.0 parts by weight, preferably 0.1 to 2.0 parts by weight, with respect to a total of 100 parts by weight of the electrolyte.

Further, the fluorinated ether (F-ether) may be a compound which is represented by the following chemical formula 2 or chemical formula 3:

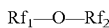  [Chemical Formula 2]

wherein $Rf_1$ and $Rf_2$ are each independently a C1-C12 fluoroalkyl group, wherein the fluoroalkyl group has a fluorination ratio of 50 to 100%.

  [Chemical Formula 3]

wherein $Rf_1$ is a C1-C12 fluoroalkyl group, wherein the fluoroalkyl group has a fluorination ratio of 50 to 100%, and R is a C1-C12 hydrocarbon.

Further, the phosphazene may be a compound which is represented by the following chemical formula 4:

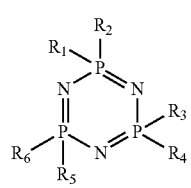  [Chemical Formula 4]

wherein $R_1$ to $R_6$ are each independently selected from F or $O—R_7$, wherein $R_7$ is selected from an alkyl, a fluorinated alkyl, or an aromatic group.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain principles of the present disclosure. In the drawings.

DETAILED DESCRIPTION

Figure 1:
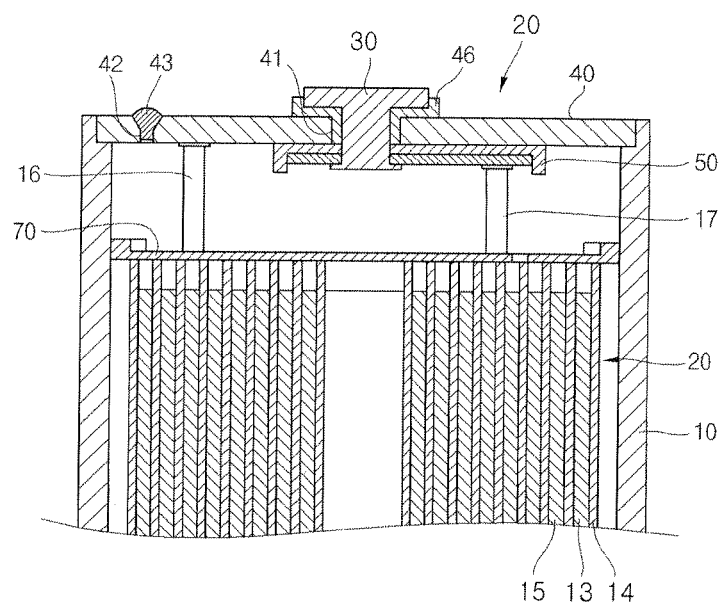
FIG. 1 illustrates a partial cross-sectional view of a lithium secondary battery according to an embodiment.
Figure 2:
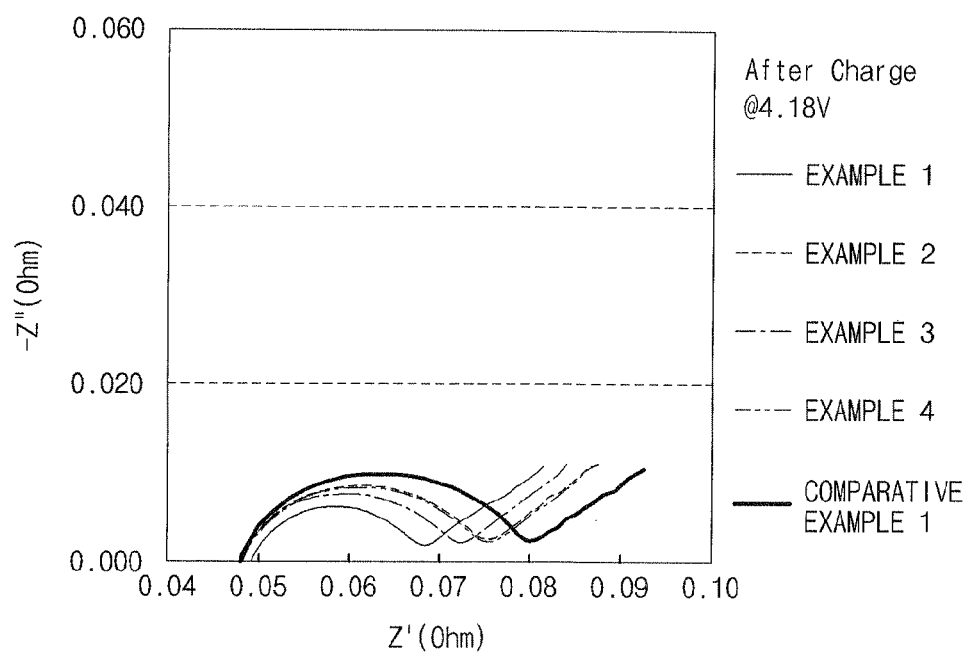
FIG. 2 is a graph illustrating impedance measurement results after charging of batteries according to Examples 1 to 4 and Comparative Example 1.
Figure 3:
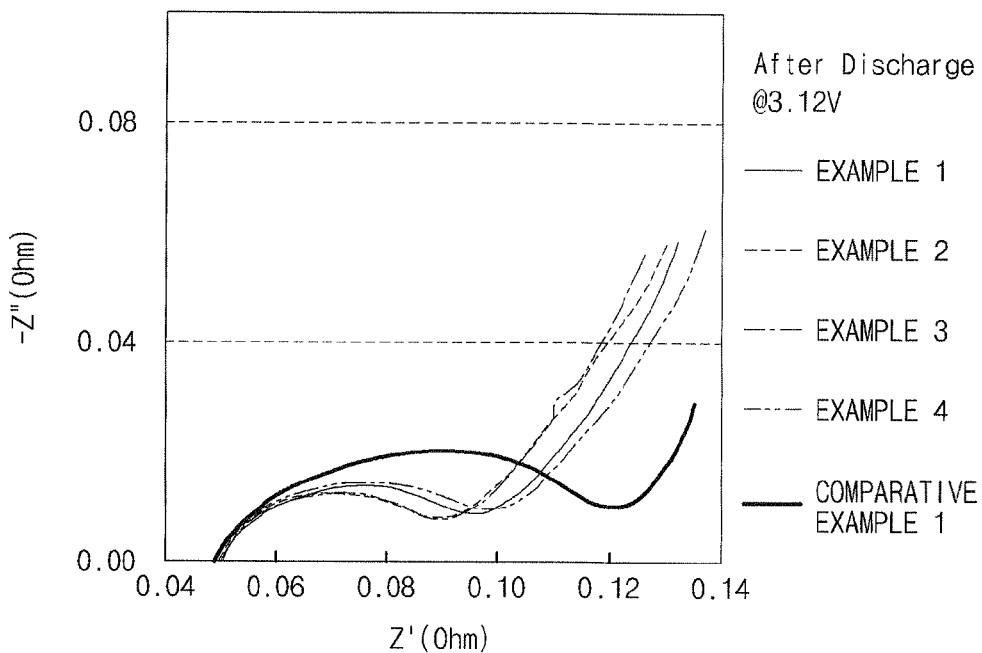
FIG. 3 is a graph illustrating impedance measurement results after discharging of batteries according to Examples 1 to 4 and Comparative Example 1.
Figure 4:
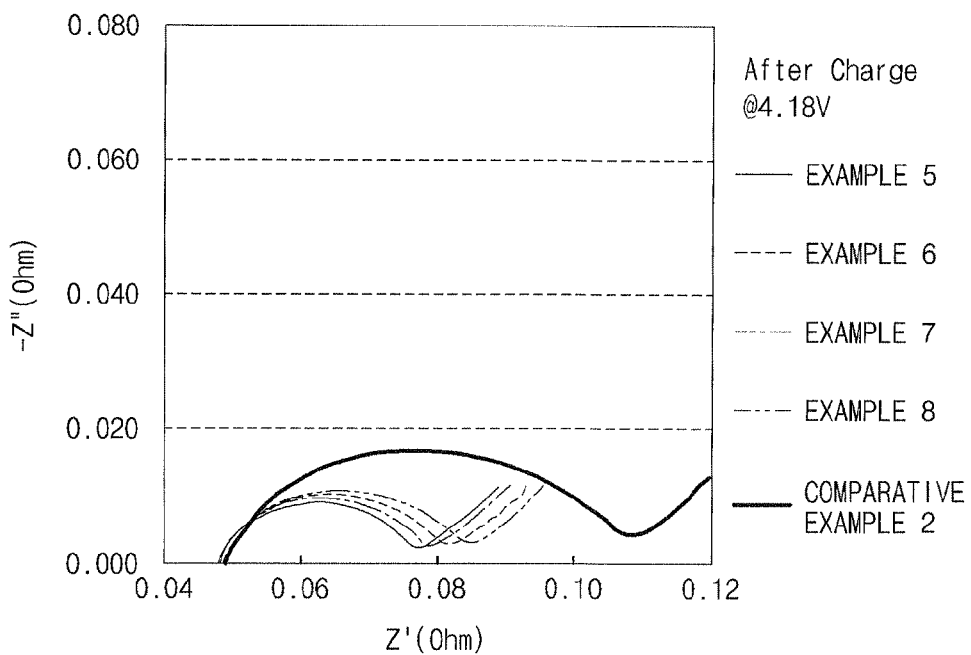
FIG. 4 is a graph illustrating impedance measurement results after charging of batteries according to Examples 5 to 8 and Comparative Example 2.
Figure 5:
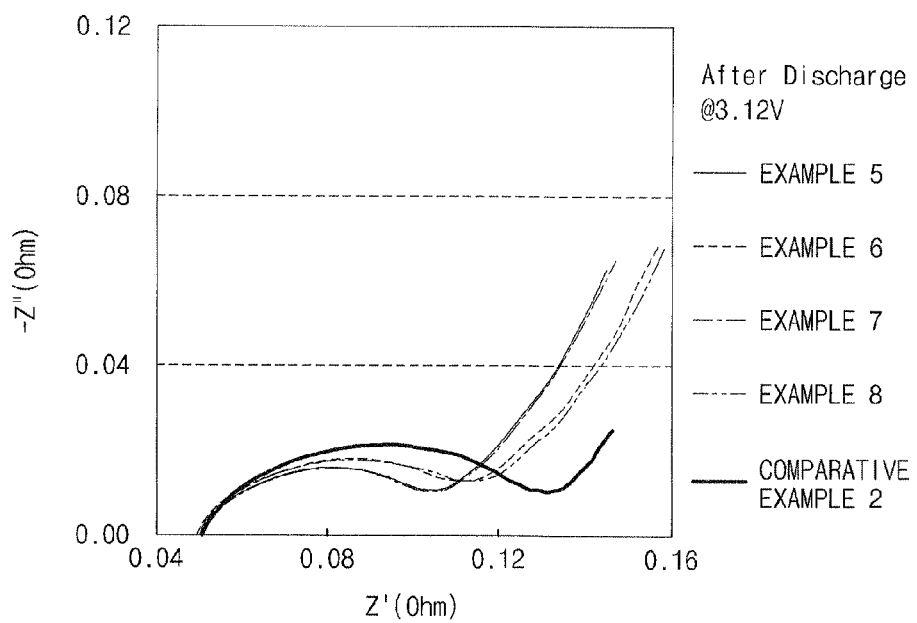
FIG. 5 is a graph illustrating impedance measurement results after discharging of batteries according to Examples 5 to 8 and Comparative Example 2.

Korean Patent Application No. 10-2010-0097285 filed on Oct. 6, 2010, in the Korean Intellectual Property Office, and entitled: "Electrolyte for lithium secondary battery and lithium secondary battery including the same" is incorporated by reference herein in its entirety.

Hereinafter, an electrolyte for a lithium for the lithium secondary battery and a lithium secondary battery including the same of embodiments of the present invention will be described in detail with reference to Examples.

An electrolyte for a lithium secondary battery according to an embodiment of the present invention includes a non-aqueous organic solvent, a lithium salt, fluorinated ether (F-ether) or phosphazene, and a resistance-improving additive represented by the following chemical formula 1. Furthermore, the electrolyte for a lithium secondary battery may further include a life-improving additive to improve the life of the battery:

FSO$_2$—R$_1$—SO$_2$F　　　　　　　　[Chemical Formula 1]

wherein R$_1$ is a C1-C12 hydrocarbon unsubstituted or substituted with at least one fluorine, preferably a C1-C5 hydrocarbon unsubstituted or substituted with at least one fluorine.

The hydrocarbon of the chemical formula 1 may include an alkylene group.

In the specification and the claims, the terms "fluorinated" and "fluoroalkyl" means that one or more of hydrogen atoms are substituted with fluorine.

The resistance-improving additive reduces resistance of a film formed on the surface of a negative electrode of the lithium secondary battery and improves high temperature properties and life characteristics of the lithium secondary battery.

The resistance-improving additive is added in an amount of 0.1 to 5.0 parts by weight, preferably 0.1 to 2.0 parts by weight, with respect to the total electrolyte weight of 100 parts by weight. If the resistance-improving additive is contained in an amount of less than 0.1 part by weight, an effect of reducing resistance of the film is inadequate, and effects of improving high temperature properties and life characteristics of the battery are inadequate accordingly. If the resistance-improving additive is contained in an amount of greater than 5.0 parts by weight, capacity of the battery may be reduced.

The fluorinated ether is selected from a compound which is represented by the following chemical formula 2 or chemical formula 3:

Rf$_1$—O—Rf$_2$　　　　　　　　[Chemical Formula 2]

wherein Rf$_1$ and Rf$_2$ are each independently a C1-C12 fluoroalkyl group, wherein the fluoroalkyl group has a fluorination ratio of 50 to 100%.

Rf$_1$—O—R　　　　　　　　[Chemical Formula 3]

wherein Rf$_1$ is a C1-C12 fluoroalkyl group, wherein the fluoroalkyl group has a fluorination ratio of 50 to 100%, and R is a C1-C12 hydrocarbon. The fluorination ratio means a ratio of a substitution of substitutable hydrogens in R$_1$, Rf$_1$, and Rf$_2$ with fluorine. For example, the fluorination ratio of the HCF$_2$(CF$_2$)$_3$CH$_2$ group is 73% since 8 hydrogens out of 11 substitutable hydrogens has been substituted with fluorine.

The fluorinated ether as flame retarding solvent is mixed together with non-aqueous organic solvent to form a solvent mixture. The fluorinated ether may be mixed with the non-aqueous organic solvent in a 5 to 40% by volume with respect to the volume of the solvent mixture. A battery has inadequate effects of improving flame retardancy, high-temperature stability, and life characteristics if the fluorinated ether is added in an amount less than the foregoing range, and mobility of lithium ions may decrease since viscosity of the electrolyte increases if the fluorinated ether is added in an amount more than the foregoing range.

The phosphazene is selected from a compound which is represented by the following chemical formula 4:

[Chemical Formula 4]

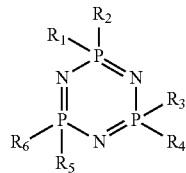

wherein R$_1$ to R$_6$ are each independently selected from F or O—R$_7$, wherein R$_7$ is selected from an alkyl, a fluorinated alkyl, and an aromatic group.

The phosphazene as flame retarding solvent is mixed with non-aqueous organic solvent to form a solvent mixture. The phosphazene may be mixed with the non-aqueous organic solvent in 5 to 20% by volume with respect to the volume of the solvent mixture. A battery has inadequate effects of improving flame retardancy, high-temperature safety, and life characteristics of the battery if the phosphazene is added in an amount less than the foregoing range, and mobility of lithium ions may decrease since viscosity of the electrolyte increases if the phosphazene is added in an amount more than the foregoing range.

Examples of the life-improving additive may include one selected from the group consisting of vinylene carbonate (VC), vinyl ethylene carbonate (VEC), succinonitrile (SN), succinic anhydride (SA), and propene sultone (PS) and mixtures thereof. The amount of the life-improving additive may be properly controlled.

Examples of the non-aqueous organic solvent may include one selected from the group consisting of carbonate, ester, ether, and ketone, and mixtures thereof.

Examples of the carbonate-based solvent may include dimethyl carbonate (DMC), diethyl carbonate (DEC), dipropyl carbonate (DPC), methylpropyl carbonate (MPC), ethylpropyl carbonate (EPC), ethylmethyl carbonate (EMC), ethylene carbonate (EC), propylene carbonate (PC), butylenes carbonate (BC), and others.

Examples of the ethylene carbonate may include difluoroethylene carbonate, chloroethylene carbonate, dichloroethylene carbonate, bromoethylene carbonate, dibromoethylene carbonate, nitroethylene carbonate, cyanoethylene carbonate, fluoroethylene carbonate, and others.

Examples of the ester-based solvent may include n-methyl acetate, n-ethyl acetate, n-propyl acetate, dimethyl acetate, methyl propionate, ethyl propionate, γ-butyrolactone, decanolide, valerolactone, mevalonolactone, caprolactone, and others.

Examples of the ether-based solvent may include dibutyl ether, tetraglyme, diglyme, dimethoxyethane, 2-methyl tetrahydrofuran, tetrahydrofuran, and others.

Examples of the ketone-based solvent may include cyclohexanone, poly(methyl vinyl ketone), and others.

The non-aqueous organic solvents may be used alone or in combination with one or more thereof. A mixing ratio of the non-aqueous organic solvents may be properly controlled according to target performance of the battery if the non-aqueous organic solvents are used in a mixture of one or more thereof. The organic solvents should have high dielectric constants and low viscosities to smoothen conduction of ions by increasing degree of dissociation of ions. It is preferable to use a mixture of two or more solvents including a solvent(s) having high dielectric constant and high viscosity and a solvent(s) having low dielectric constant and low viscosity.

The carbonate-based solvent may be a mixture of cyclic carbonate and chained carbonate. In this case, cyclic carbonate and chained carbonate are mixed with each other at a volume ratio of 1:1 to 1:9 such that performance of the electrolyte is shown to be excellent.

The lithium salt acts as a supply source of lithium ions in the battery, and plays a role of enabling basic operation of lithium secondary battery and promoting the movement of lithium ions between positive and negative electrodes. The lithium salt may be one selected from the group consisting of LiPF$_6$, LiBF$_4$, LiFOB, LiBOB, LiN(SO$_2$CF$_3$)$_2$, LiN(SO$_2$C$_2$F$_5$)$_2$, LiFSI, LiN(SO$_2$C$_2$F$_4$SO$_2$), LiN(SO$_2$CF$_2$)$_2$, LiTFSI, LiCTFSI, LiSbF$_6$, LiAsF$_6$, LiClO$_4$, LiCF$_3$SO$_3$, LiC$_4$F$_9$SO$_3$, LiAlO$_4$, LiAlCl$_4$, LiN(C$_p$F$_{2p+1}$SO$_2$)(C$_q$F$_{2q+1}$SO$_2$) (wherein, p and q are natural numbers), LiCl, LiI, and mixtures thereof. The lithium salt is preferably a lithium salt which has low lattice energy and high dissociation degree such that the lithium salt is excellent in ion conductivity and has good thermal stability and oxidation resistance.

The lithium salt may be used from about 0.1 M to about 2.0 M. There are limitations in that performance of the electrolyte deteriorates since conductivity of an electrolyte is lowered if the concentration of the lithium salt is less than 0.1 M, and mobility of lithium ions decreases since viscosity of the electrolyte increases if the concentration of the lithium salt is more than 2.0 M.

Hereinafter, a lithium secondary battery including an electrolyte for lithium secondary battery according to an embodiment of the present invention will be described.

FIG. 1 illustrates a partial cross-sectional view of a lithium secondary battery according to an embodiment.

Referring to FIG. 1, a lithium secondary battery according to an embodiment of the present invention includes a can 10, an electrode assembly 12, a cap assembly 20, and an electrolyte. The electrode assembly 12 and electrolyte are housed in the can 10, and the cap assembly 20 seals a top part of the can to form the lithium secondary battery.

The electrode assembly 12 includes a positive electrode 13 having, for example, a shape of a plate, a negative electrode 15, and a separator 14. The electrode assembly 12 may be formed by sequentially stacking and then winding the positive electrode 13, separator 14, and negative electrode 15.

The positive electrode 13 is formed by coating positive electrode active materials on the surface of a positive electrode collector. Aluminum, aluminum alloys, and others may be used as the positive electrode collector. The positive electrode collector may be formed in the form of a foil or mesh. The mixture is coated on the surface of the positive electrode collector after preparing a mixture in a slurry state by dispersing the positive electrode active materials into solvent along with a binder and conductive material, and thickening agent if necessary.

The positive electrode active materials are formed from materials into which lithium ions can be reversibly intercalated, and from which the lithium ions can be reversibly deintercalated. Examples of the positive electrode active materials may include at least one selected from cobalt, manganese, and nickel and composite metal oxides of lithium. The positive electrode active materials may additionally include elements selected from the group consisting of Mg, Al, Co, K, Na, Ca, Si, Ti, Sn, V, Ge, Ga, B, As, Zr, Mn, Cr, Fe, Sr, V, and rare earth elements.

The negative electrode 15 is formed by coating negative electrode active materials on the surface of a negative electrode collector. Copper, copper alloy, and others may be used as the negative electrode collector. The negative electrode collector may be formed in the form of a foil or mesh. The mixture is coated on the surface of the negative electrode collector after preparing a mixture in a slurry state by dispersing the negative electrode active materials into solvent along with a binder and conductive material, and thickening agent if necessary.

The negative electrode active materials are formed of materials into which lithium ions can be intercalated, and from which the lithium ions can be deintercalated. Examples of the negative electrode active materials may include carbon-based negative electrode active materials (thermally decomposed carbon, coke or graphite) such as crystalline or amorphous carbon and carbon composites, and burnt organic polymer compounds, carbon fibers, tin oxide compounds, lithium metal, and alloys of lithium and other elements. Examples of the amorphous carbon may include hard carbon, coke, mesocarbon microbeads (MCMB) baked at 1500° C. or less, mesophase pitch-based carbon fiber (MPCF), and others. Examples of the crystalline carbon may include graphite-based materials, specifically natural graphite, graphitized coke, graphitized MCMB, graphitized MPCF, and others.

The separator 14 is located between the positive electrode 13 and negative electrode 15 to prevent a short circuit of the positive electrode 13 and negative electrode 15. Examples of the separator 14 may include well-known materials such as polymer membranes of polyolefin, polypropylene and polyethylene, or multilayer films thereof, microporous films, woven fabrics, and nonwoven fabrics.

The cap assembly 20 may include a cap 40, an insulation member 50, a terminal 60, and an electrode terminal 30. The cap assembly 20 is assembled with an insulation case 70 to seal the can 10.

The electrode terminal 30 is inserted into a terminal through-hole 41 formed in the center of the cap 40. The electrode terminal 30 is inserted into the terminal through-hole 41 together with the tube type gasket in a state that a tube type gasket 46 is coupled to the outer face of the electrode terminal 30 when inserting the electrode terminal 30 into the terminal through-hole 41. Therefore, the electrode terminal 30 is electrically insulated with the cap 40.

The electrolyte is injected into the can 10 through an electrolyte injection hole 42 after the cap assembly 20 is assembled onto the top part of the can 10. The electrolyte injection hole 42 is sealed by a separate stopper 43. The electrode terminal 30 is connected to a negative electrode tab 17 of the negative electrode 15 or a positive electrode tab 16 of the positive electrode 13 such that the electrode terminal 30 acts as a negative terminal or a positive terminal.

On the other hand, the lithium secondary battery may be formed in a unit cell constructed in a structure of positive electrode/separator/negative electrode, a bi-cell constructed in a structure of positive electrode/separator/negative electrode/separator/positive electrode, or a stack of several unit cells.

Further, a lithium secondary battery of the present invention may be formed in other shapes such as a cylindrical shape and a pouch shape in addition to the illustrated prismatic shape.

Hereinafter, an electrolyte for lithium secondary battery of the present invention will be described in more detail with reference to the following Examples and Comparative Examples. However, the following Examples and Comparative Examples are provided for illustrative purposes only, and the scope of the present invention should not be limited thereto in any manner.

EXAMPLE 1

A positive electrode active material slurry was prepared by dispersing LiCoO$_2$ as positive electrode active material, polyvinylidene fluoride (PVdF) as binder, and carbon as conductive material into N-methyl-2-pyrrolidone solvent in a weight ratio of 92:4:4. A positive electrode was manufactured by coating the positive electrode active material slurry on an aluminum foil with a thickness of 15 μm, drying the positive electrode active material slurry coated on the aluminum foil, and rolling the dried positive electrode active material slurry coated on the aluminum foil. A negative electrode active material slurry was prepared by dispersing the mixture into water after mixing graphite as negative electrode active material, styrene-butadiene rubber (SBR) as binder, and carboxymethyl cellulose (CMC) as thickening agent in a weight ratio of 96:2:2. A negative electrode was manufactured by coating the negative electrode active material slurry on a copper foil with a thickness of 10 μm, drying the negative electrode active material slurry coated on the copper foil, and rolling the dried negative electrode active material slurry coated on the copper foil.

The wound layers were inserted into a prismatic can having dimensions of 46 mm×34 mm×50 mm after inserting a polyethylene (PE) separator with a thickness of 18 μm between the electrodes and winding the respective layers. An electrolyte was injected into the can to manufacture a lithium secondary battery.

The electrolyte was prepared by mixing 0.5 M of $LiPF_6$ and 0.5 M of LiTFSI with a solvent mixture of ethylene carbonate (EC), fluoroethylene carbonate (FEC), ethylmethyl carbonate (EMC), and fluorinated ether (F/H=2) which were mixed at a volume ratio of 20:5:55:20, adding 0.2 part by weight of LiBF4 and 1 part by weight of SN as life-improving additives in the mixture, and then adding 1 part by weight of a resistance-improving additive in the resulting mixture. The fluorinated ether was a compound of $CF_2H$—$CF_2$—$CH_2$—O—$CF_2$—$CF_2H$, and the resistance-improving additive was a compound of $FSO_2$—$CF_2$—$SO_2F$.

EXAMPLE 2

An electrolyte for lithium secondary battery was prepared by the same method as in the Example 1 except that 0.2 part by weight of $LiBF_4$, 0.5 part by weight of SN, and 0.5 part by weight of VEC as life-improving additives were added in the mixture, and 1 part by weight of a resistance-improving additive was added in the resulting mixture.

EXAMPLE 3

An electrolyte for lithium secondary battery was prepared by the same method as in the Example 1 except that 0.4 part by weight of $LiBF_4$ and 1 part by weight of SN as the life-improving additives were added in the mixture, and 1 part by weight of the resistance-improving additive was added in the resulting mixture.

EXAMPLE 4

An electrolyte for lithium secondary battery was prepared by the same method as in the Example 1 except that 0.4 part by weight of $LiBF_4$, 0.5 part by weight of SN, and 0.5 part by weight of VEC as the life-improving additives were added in the mixture, and 1 part by weight of the resistance-improving additive was added in the resulting mixture.

EXAMPLE 5

An electrolyte for lithium secondary battery was prepared by mixing 0.5 M of $LiPF_6$ and 0.5 M of LiTFSI with a solvent mixture of ethylene carbonate (EC), fluoroethylene carbonate (FEC), ethylmethyl carbonate (EMC), fluorinated ether (F/H=2), and phosphazene represented by Chemical Formula 5 ($R_1$, $R_2$, $R_4$ and $R_5$=F, $R_3$ and $R_6$=$OCH_2CH_3$) which were mixed at a volume ratio of 20:5:50:20:5, adding 0.2 part by weight of $LiBF_4$ and 0.5 part by weight of SN as life-improving additives in the mixture, and then adding 1 part by weight of a resistance-improving additive in the resulting mixture.

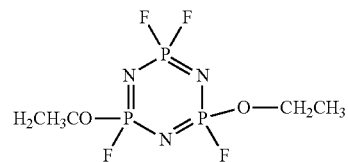

[Chemical Formula 5]

EXAMPLE 6

An electrolyte for lithium secondary battery was prepared by the same method as in the Example 5 except that 0.2 part by weight of $LiBF_4$, 0.5 part by weight of SN, and 0.5 part by weight of VEC as life-improving additives were added in the mixture, and 1 part by weight of a resistance-improving additive was added in the resulting mixture.

EXAMPLE 7

An electrolyte for lithium secondary battery was prepared by the same method as in the Example 5 except that 0.4 part by weight of $LiBF_4$ and 1 part by weight of SN as the life-improving additives were added in the mixture, and 1 part by weight of the resistance-improving additive was added in the resulting mixture.

EXAMPLE 8

An electrolyte for lithium secondary battery was prepared by the same method as in the Example 5 except that 0.4 part by weight of LiBF4, 0.5 part by weight of SN, and 0.5 part by weight of VEC as the life-improving additives were added in the mixture, and 1 part by weight of the resistance-improving additive was added in the resulting mixture.

COMPARATIVE EXAMPLE 1

An electrolyte for lithium secondary battery was prepared by mixing 0.5 M of $LiPF_6$ and 0.5 M of LiTFSI with a solvent mixture of ethylene carbonate (EC), fluoroethylene carbonate (FEC), ethylmethyl carbonate (EMC), and fluorinated ether (F/H=2) which were mixed at a volume ratio of 20:5:55:20, and adding 0.4 part by weight of $LiBF_4$ and 1 part by weight of SN as life-improving additives in the mixture.

COMPARATIVE EXAMPLE 2

An electrolyte for lithium secondary battery was prepared by mixing 0.5 M of $LiPF_6$ and 0.5 M of LiTFSI with a solvent mixture of ethylene carbonate (EC), fluoroethylene carbonate (FEC), ethylmethyl carbonate (EMC), fluorinated ether (F/H=2), and phosphazene ($R_1$, $R_2$, $R_4$, $R_5$=F, $R_3$ and $R_6$=$OCH_2CH_3$) which were mixed at a volume ratio of 20:5:50:20:5, and adding 0.4 part by weight of $LiBF_4$, 0.5 part by weight of SN, and 0.5 part by weight of VEC as life-improving additives in the mixture.

Hereinafter, described are experimental evaluations on lithium secondary batteries manufactured by the Examples and Comparative Examples.

The experimental evaluations on the lithium secondary batteries included evaluations on capacities of batteries, impedances of the batteries, charging efficiencies of the batteries, batteries left alone at angles of 90 degrees and 45 degrees, and normal-temperature lives of the batteries.

EXPERIMENTAL EXAMPLE 1

Capacity Evaluation

Lithium secondary batteries manufactured in the Examples 1 to 8 and Comparative Examples 1 and 2 were charged at room temperature for 10 minutes under 0.51C/4.2V_0.1CmA cutoff conditions, and the charged batteries were discharged for 10 minutes under 0.2C/2.75V cutoff conditions. Evaluation results of battery capacities were represented in Table 1. The lithium secondary batteries manufactured in the Examples 1 to 4 exhibited 99% or more of capacities compared to the lithium secondary battery manufactured in the Comparative Example 1, and the lithium secondary batteries manufactured in the Examples 5 to 8 exhibited 99% or more of capacities compared to the lithium secondary battery manufactured in the Comparative Example 2. Therefore, it can be seen that the lithium secondary batteries manufactured in the Examples 1 to 8 have the substantially same battery capacities as that of an existing lithium secondary battery.

TABLE 1

|  | Measurement results of capacities |
|---|---|
| Comparative Example 1 | 1262.56 |
| Example 1 | 1253.93 |
| Example 2 | 1255.63 |
| Example 3 | 1252.47 |
| Example 4 | 1254.74 |
| Comparative Example 2 | 1261.66 |
| Example 5 | 1251.75 |
| Example 6 | 1253.12 |
| Example 7 | 1250.79 |
| Example 8 | 1253.57 |

EXPERIMENTAL EXAMPLE 2

Impedance Evaluation

Lithium secondary batteries manufactured in the Examples 1 to 8 and Comparative Examples 1 and 2 were charged under 0.51C14.2V_0.1CmA cutoff conditions, and the charged batteries were left alone for one hour to measure impedances of the charged batteries. The charged batteries were discharged under 0.2C/2.75V cutoff conditions, and the discharged batteries were left alone for one hour to measure impedances of the discharged batteries. The impedances were measured while applying a voltage of AC 5 mV in a frequency range from 100 kHz to 100 mHz. Measurements results of the impedances were illustrated in FIG. 2 to FIG. 5. It can be seen that, after charging or discharging the lithium secondary batteries manufactured in the Examples 1 to 4, impedances of the lithium secondary batteries were decreased compared to impedance of the lithium secondary battery manufactured in the Comparative Example 1. Further, it can be seen that, after charging or discharging the lithium secondary batteries manufactured in the Examples 5 to 8, impedances of the lithium secondary batteries were decreased compared to impedance of the lithium secondary battery manufactured in the Comparative Example 2.

EXPERIMENTAL EXAMPLE 3

Charging Efficiency Evaluation

Formation efficiencies of the batteries were measured while discharging the charged batteries under 240 mA 2.75V cutoff conditions after charging lithium secondary batteries manufactured in the Examples 5 to 8 and Comparative Example 2 to constant current-constant voltage under 240 mA 4.2V 20 mA cutoff conditions. Further, charging efficiencies of the batteries were measured at 1C while discharging the charged batteries under 240 mA 3.1V cutoff conditions after charging the lithium secondary batteries to constant current-constant voltage at 1C under 1200 mA 4.2V 60 mA cutoff conditions. Measurement results of charging efficiencies were represented in Table 2. It can be seen that formation efficiencies and 1C charging efficiencies of the lithium secondary batteries manufactured in the Examples 5 to 8 are more excellent than formation efficiency and 1C charging efficiency of the lithium secondary battery manufactured in the Comparative Examples 2.

TABLE 2

|  | Formation Efficiency (%) | 1 C charging efficiency(%) |
|---|---|---|
| Comparative Example 2 | 89.2 | 96.6 |
| Example 5 | 92.0 | 96.9 |
| Example 6 | 92.7 | 97.1 |
| Example 7 | 91.9 | 97.1 |
| Example 8 | 92.2 | 97.1 |

EXPERIMENTAL EXAMPLE 4

Evaluation of Batteries Left Alone at 90° C.

Battery thicknesses and recovered battery capacities were measured with respect to lithium secondary batteries manufactured in the Examples 1 to 4 and Comparative Example 1 after repeating three times the processes of charging the batteries under 1220 mA 4.2V conditions for 30 minutes, leaving alone the charged batteries at 90° C. for 5 hours, and maintaining the resulting batteries for 12 hours. Measurements results of the battery thicknesses and battery capacities are represented in Table 3.

It can be seen that the lithium secondary batteries manufactured in the Examples 1 to 4 have high capacities and excellent recovery capacities after leaving the batteries alone at high temperatures compared to the lithium secondary battery manufactured in the Comparative Example 1. Further, it can be seen that the lithium secondary batteries manufactured in the Examples 1 to 4 have small swelling degrees compared to the lithium secondary battery manufactured in the Comparative Example 1 since thicknesses of the lithium secondary batteries manufactured in the Examples 1 to 4 are measured to be smaller than that of the lithium secondary battery manufactured in the Comparative Example 1 after leaving the batteries alone at high temperatures.

TABLE 3

|  | Battery thickness | Battery capacity (1 C) |
|---|---|---|
| Comparative Example | 6.32 | 1124 |
| Example 1 | 6.28 | 1135 |
| Example 2 | 6.27 | 1141 |
| Example 3 | 6.27 | 1129 |
| Example 4 | 6.29 | 1126 |

EXPERIMENTAL EXAMPLE 5

Evaluation of Batteries Left Alone at 45° C.

Recovered battery capacities were measured with respect to lithium secondary batteries manufactured in the Examples 1 to 4 and Comparative Example 1 after repeating three times the processes of charging the batteries under 950 mA 4.2V 60 mA cutoff conditions for 30 minutes, leaving alone the charged batteries at 45° C. for 30 days, and maintaining the resulting batteries for 5 days. Measurements results of the battery capacities are represented in Table 4.

It can be seen that the lithium secondary batteries manufactured in the Examples 1 to 4 have high capacities and excellent recovery capacities after leaving the batteries alone at high temperatures compared to the lithium secondary battery manufactured in the Comparative Example 1.

TABLE 4

|  | Battery Capacity (1 C) |
| --- | --- |
| Comparative Example 1 | 1094 |
| Example 1 | 1117 |
| Example 2 | 1128 |
| Example 3 | 1123 |
| Example 4 | 1131 |

EXPERIMENTAL EXAMPLE 6

Evaluation of Cycle Lives of Batteries at Normal Temperature

Changes in battery capacities and battery thicknesses were measured with respect to lithium secondary batteries manufactured in the Example 5 and Comparative Example 2 after repeating 300 times the processes of charging the batteries to constant current-constant voltage under 950 mA 4.2V 120 mA cutoff conditions, and discharging the charged batteries under 1200 mA 3.1V cutoff conditions. Measurements results of the changes in battery capacities and thicknesses are represented in Table 5. It can be seen that the lithium secondary battery manufactured in the Example 5 has long cycle life at normal temperature and relaxed degree of change in thickness compared to the lithium secondary battery manufactured in the Comparative Example 2.

TABLE 5

|  | First Cycle (Compared to % capacity) | Three hundredth Cycle (Compared to % capacity) | Three hundredth Cycle Thickness Increase (%) |
| --- | --- | --- | --- |
| Comparative Example 2 | 98.6 | 88.6 | 6.6 |
| Example 5 | 97.9 | 88.8 | 3.7 |

A lithium secondary battery including an electrolyte for lithium secondary battery of the present invention has effects of flame retardancy, low negative electrode interfacial resistance, and excellent high temperature properties and life characteristics.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present disclosure as set forth in the following claims.

What is claimed is:

1. An electrolyte for lithium secondary battery, the electrolyte comprising:
    a non-aqueous organic solvent;
    a lithium salt;
    phosphazene; and
    a resistance-improving additive represented by the following Chemical Formula (1):

$$FSO_2—R_1—SO_2F \quad \text{[Chemical Formula 1]}$$

wherein $R_1$ is a C1-C12 hydrocarbon unsubstituted or substituted with at least one fluorine; wherein
    the phospazene is a compound of Chemical Formula 5:

[Chemical Formula 5]

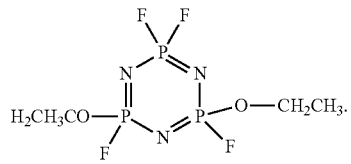

2. The electrolyte as claimed in claim 1, wherein the resistance-improving additive is included in an amount of 0.1 to 2.0 parts by weight with respect to a total of 100 parts by weight of the electrolyte.

3. The electrolyte as claimed in claim 1, wherein the resistance-improving additive is included in an amount of 0.1 to 5.0 parts by weight with respect to the a total of 100 parts by weight of the electrolyte.

4. The electrolyte as claimed in claim 1, wherein the fluorinated ether is contained in an amount of 5 to 40% by volume with respect to the total volume of a solvent mixture.

5. The electrolyte as claimed in claim 1, wherein the electrolyte comprises the phosphazene is contained in an amount of 5 to 20% by volume with respect to the total volume of the solvent mixture.

6. The electrolyte as claimed in claim 1, wherein the non-aqueous organic solvent comprises one selected from the group consisting of carbonate, ester, ether, ketone, and mixtures thereof.

7. The electrolyte as claimed in claim 6, wherein the carbonate is selected from the group consisting of dimethyl carbonate, diethyl carbonate, dipropyl carbonate, methylpropyl carbonate, ethylpropyl carbonate, ethylmethyl carbonate, ethylene carbonate, propylene carbonate, butylenes carbonate, pentylene carbonate, and mixtures thereof;
    the ester is selected from the group consisting of n-methyl acetate, n-ethyl acetate, n-propyl acetate, dimethyl acetate, methyl propionate, ethyl propionate, γ-butyrolactone, decanolide, valerolactone, mevalonolactone, caprolactone, and mixtures thereof;
    the ether is selected from the group consisting of dibutyl ether, tetraglyme, diglyme, dimethoxyethane, 2-methyl tetrahydrofuran, tetrahydrofuran, and mixtures thereof; and
    the ketone is selected from the group consisting of cyclohexanone, poly(methyl vinyl ketone), and a mixture thereof.

8. The electrolyte as claimed in claim 7, wherein the ethylene carbonate is selected from the group consisting of difluoroethylene carbonate, chloroethylene carbonate, dichloroethylene carbonate, bromoethylene carbonate, dibromoethylene carbonate, nitroethylene carbonate, cyanoethylene carbonate, fluoroethylene carbonate, and mixtures thereof.

9. The electrolyte as claimed in claim 1, wherein the lithium salt is selected from the group consisting of $LiPF_6$, $LiBF_4$, LiFOB, LiBOB, $LiN(SO_2CF_3)_2$, $LiN(SO_2C_2F_5)_2$, LiFSI, $LiN(SO_2C_2F_4SO_2)$, $LiN(SO_2CF_2)_2$, LiTFSI, LiCTFSI, $LiSbF_6$, $LiAsF_6$, $LiClO_4$, $LiCF_3SO_3$, $LiC_4F_9SO_3$, $LiAlO_4$, $LiAlO_4$, $LiN(C_pF_{2p+1}SO_2)(C_qF_{q+1}SO_2)$ where p and q are natural numbers, LiCl, LiI, and mixtures thereof.

10. The electrolyte as claimed in claim 1, further comprising a life-improving additive selected from the group consisting of vinylene carbonate (VC), vinyl ethylene carbonate (VEC), succinonitrile (SN), succinic anhydride (SA), and propane sulfone (PS) and a mixture thereof.

11. A lithium secondary battery comprising:
a positive electrode including positive electrode active materials into which lithium ions can be reversibly intercalated, and from which the lithium ions can be reversibly deintercalated;
a negative electrode including negative electrode active materials into which lithium ions can be reversibly intercalated, and from which the lithium ions can be reversibly deintercalated; and
the electrolyte of claim 1.

12. A lithium secondary battery, comprising:
a positive electrode;
a negative electrode; and
an electrolyte comprising:
a non-aqueous organic solvent;
a lithium salt;
phosphazene; and
a resistance-improving additive represented by Chemical Formula (1):

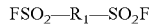  [Chemical Formula 1]

wherein $R_1$ is a C1-C12 hydrocarbon unsubstituted or substituted with at least one fluorine; wherein
the phosphanzene is a compound of Chemical Formula 5:

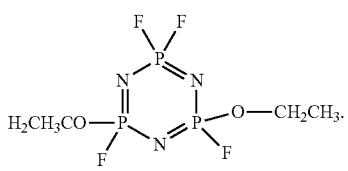  [Chemical Formula 5]

13. The lithium secondary battery of claim 12, wherein the electrolyte further comprises a life-improving additive selected from the group consisting of vinylene carbonate (VC), vinyl ethylene carbonate (VEC), succinonitrile (SN), succinic anhydride (SA), and propane sulfone (PS) and a mixture thereof.

14. The lithium secondary battery of claim 12, wherein the resistance-improving additive is a compound of $FSO_2$—$CF_2$—$SO_2F$.

15. An electrolyte for a lithium secondary battery, the electrolyte comprising:
a non-aqueous organic solvent;
a lithium salt;
fluorinated ether and phosphazene; and
a resistance-improving additive represented by the following Chemical Formula (1):

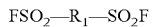  [Chemical Formula 1]

wherein $R_1$ is a $C_1$-$C_{12}$ hydrocarbon unsubstituted or substituted with at least one fluorine; wherein
the phosphazene is a compound of Chemical Formula 5:

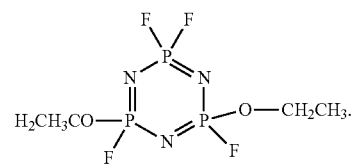  [Chemical Formula 5]

16. A lithium secondary battery, comprising:
a positive electrode;
a negative electrode; and
an electrolyte comprising:
a non-aqueous organic solvent;
a lithium salt;
fluorinated ether and phosphazene; and
a resistance-improving additive represented by Chemical Formula (1):

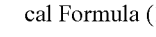  [Chemical Formula 1]

wherein $R_1$ is a $C_1$-$C_{12}$ hydrocarbon unsubstituted or substituted with at least one fluorine; wherein
the phosphazene is a compound of Chemical Formula 5:

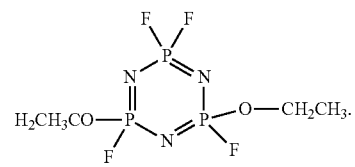  [Chemical Formula 5]

* * * * *